United States Patent [19]
Grün et al.

[11] Patent Number: 5,403,137
[45] Date of Patent: Apr. 4, 1995

[54] PROCESS AND DEVICE FOR ATTACHING AN OBJECT TO A LIGHTWEIGHT MATERIAL WALL

[75] Inventors: Jurgen Grün, Botzingen; Albert Frischmann, Kenzingen, both of Germany

[73] Assignee: UPAT GmbH & Co., Emmendingen, Germany

[21] Appl. No.: 70,365

[22] Filed: Jun. 7, 1993

[30] Foreign Application Priority Data

Dec. 13, 1990 [DE] Germany .......................... 40 39 831.5
Oct. 5, 1991 [DE] Germany .......................... 41 33 105.2

[51] Int. Cl.$^6$ .......................... F16B 25/00; F16B 37/12
[52] U.S. Cl. .......................... 411/387; 411/29; 411/178; 29/456
[58] Field of Search .......................... 411/29, 30, 31, 387, 411/178, 410, 418, 423; 29/456, 525.1

[56] References Cited

U.S. PATENT DOCUMENTS

| | | |
|---|---|---|
| 1,894,034 | 1/1933 | Fieg ..................... 411/410 |
| 2,806,706 | 9/1957 | Fitch . | 
| 3,289,290 | 12/1966 | Sandor . |
| 3,866,509 | 2/1975 | Kraus et al. ..................... 411/418 X |
| 3,866,510 | 2/1975 | Eibes et al. ..................... 411/418 |
| 3,935,786 | 2/1976 | Murray et al. ..................... 411/29 |
| 4,189,975 | 2/1980 | Nisida et al. ..................... 411/423 |
| 5,190,425 | 3/1993 | Wieder et al. ..................... 411/29 X |

FOREIGN PATENT DOCUMENTS

| | | |
|---|---|---|
| 0165674 | 12/1985 | European Pat. Off. . |
| 0425358A1 | 5/1991 | European Pat. Off. . |
| 2256938C3 | 5/1974 | Germany . |
| 2419111C2 | 11/1975 | Germany . |

OTHER PUBLICATIONS

International Search Report Dated Jan. 10, 1992, from International Patent Application Serial No. PCT/DE91/00792.
English Language Abstract of EPC Patent No. 0425358A1 and German Patent No. DE2419111.

Primary Examiner—Neill R. Wilson
Attorney, Agent, or Firm—Baker & Daniels

[57] ABSTRACT

A device for fastening an object to a wall including an insert having self-tapping external threading, a cavity, and an insertion end. A setting tool removably engages the insert cavity and has a tool blade protruding through the insert cavity and the insertion end. The tool blade includes a drilling point for making a rough opening in the wall. The setting tool screws the insert into the rough opening whereby the external threading engages the rough opening. A fastener is screwed into the insert cavity upon removal of the setting tool.

18 Claims, 2 Drawing Sheets

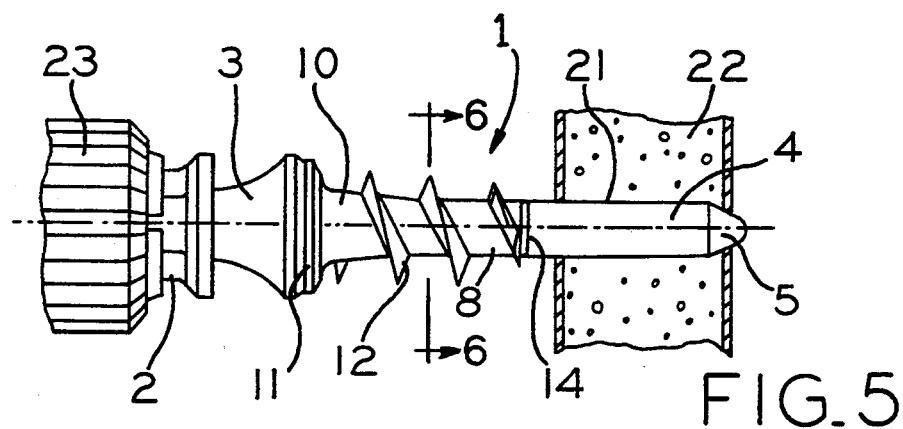
FIG_5
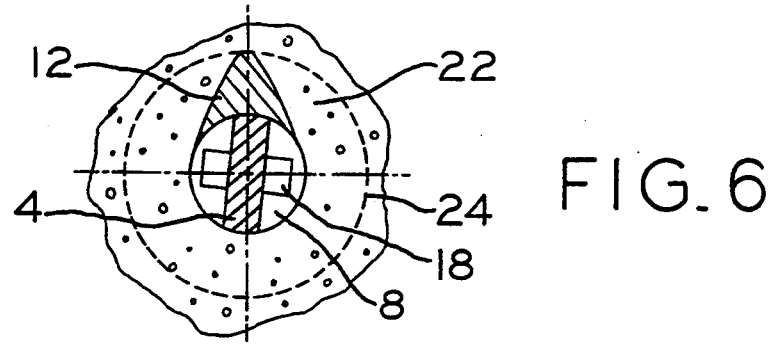
FIG_6
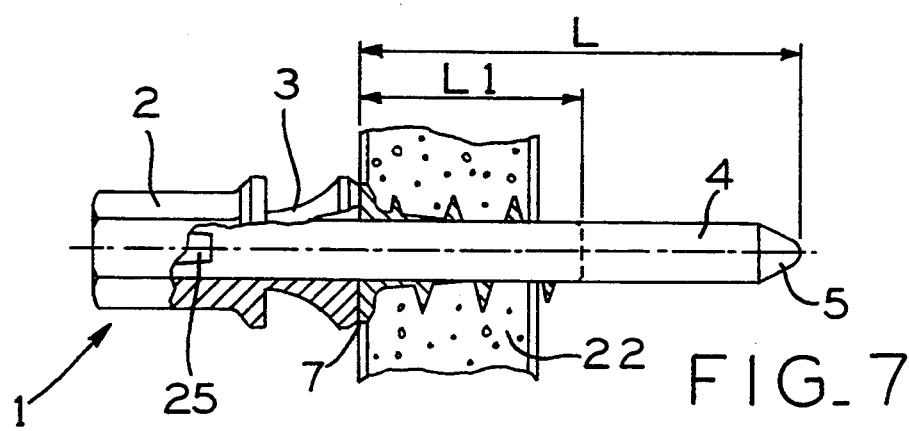
FIG_7
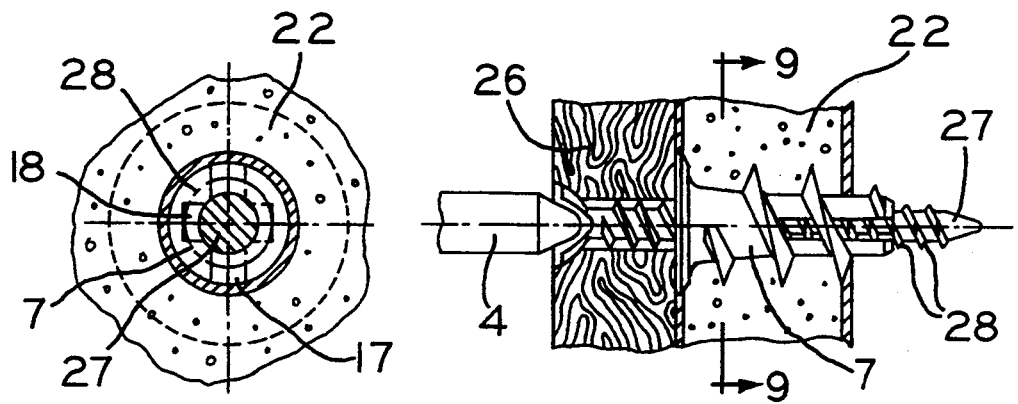
FIG_9    FIG_8

PROCESS AND DEVICE FOR ATTACHING AN OBJECT TO A LIGHTWEIGHT MATERIAL WALL

BACKGROUND OF THE INVENTION

The problem concerns a process for attaching an object to a lightweight material wall with the aid of an insert which features a self-tapping external threading and a cavity for receiving a fastener, and which is turned into a rough hole with the aid of a setting tool engaging the cavity, with a fastener being screwed into the cavity upon removal of the setting tool.

Moreover, the invention relates to a mounting device for the application of the process, with an insert featuring a cavity for receiving a fastener and featuring a self-tapping external threading, and with a setting tool engaging in rotationally fixed fashion the cavity of the insert.

Processes and devices of that type are known from DE-C3-22 56 938 and DE-C2-24 19 111, the insert being closed on the front end and, upon creation of a cylindrical rough hole, turned into the latter with the aid of a power drill. As the insert is screwed into the cylindrical rough hole, its external threading cuts itself into the soft lightweight construction material, leaving the material between threads intact. This enables an anchoring free of expansion pressure, of a fastener which upon setting of the insert is screwed into its axial cavity for mounting an object.

EP-B1-165-674 describes an insert featuring on the insertion end an opening and a drill blade protruding beyond the insertion end of the insert provided with a self-tapping external threading. The drill blade makes it possible to dispense with creating a cylindrical rough hole, since it is produced in a lightweight construction material during the setting, with the aid of the drill blade arranged on the front end of the insert sleeve. As a fastener used as a screw is turned in upon setting the insert in a lightweight construction material with a material thickness smaller than the length of the insert provided with the external threading, the front end of the screw forces the drill blade sideways out of the way. Therefore, the prior insert not requiring a rough hole can be used only if its length exceeds the thickness of the lightweight construction material. An application involving merely a blind hole, and not a through-hole, is not possible because of the necessary sideways escape movement of the drill blade.

Basing on this prior art, the problem underlying the invention is to provide a process and device of the initially discussed type which in a material-saving way allow a quick and simple assembly in lightweight construction materials without preparing a rough hole.

SUMMARY OF THE INVENTION

In terms of the process, this problem is solved by using a setting tool featuring a tool blade which protrudes through the cavity of the insert beyond its insertion end and features a drilling point with the aid of which a cylindrical rough hole is prepared first, into which then, in the same operation, the insert with the self-tapping external threading is turned.

A mounting device for the application of the process includes a setting tool featuring a pointed tool blade which through the cavity of the insert can be advanced beyond its insertion end.

Since the setting tool protrudes with its blade beyond the insertion end of the insert, it is possible to produce with the tool blade, in a single operation, first a rough hole as the setting tool rotates, which rough hole is in the course of its creation engaged by the insertion end of the insert, which due to the rotary movement cuts a threading with its external threading. Upon retraction of the setting tool, a fastener —specifically a screw— can be turned into the vacated cavity of the insert. It is not necessary to prepare with a separate tool in a separate operation a cylindrical rough hole or to provide for material and measures for a drill blade that deflects sideways.

BRIEF DESCRIPTION OF THE DRAWINGS

Suitable developments and designs of the invention derive from the subclaims and the following description of an embodiment of the invention with the aid of the drawing, which shows in:

FIG. 5, a side elevation of the setting tool, inserted into the insert the toolholder of the setting tool chucked in a power drill and whose tool blade produces during the setting operation a rough hole in a lightweight material wall;

FIG. 6, a sectional view along line VI—VI in FIG. 5;

FIG. 7 the insert and setting tool after setting in the lightweight material wall, partly cut away, as a side elevation;

FIG. 8, the insert set in the lightweight material wall after a mounting screw for attachment of an object to the lightweight material wall has been turned in; and FIG. 9, a cross section of the insert illustrated in FIG. 8, showing the position of the mounting screw in the cross-slotted cavity of the insert.

DETAILED DESCRIPTION OF THE INVENTION

Figure 1:
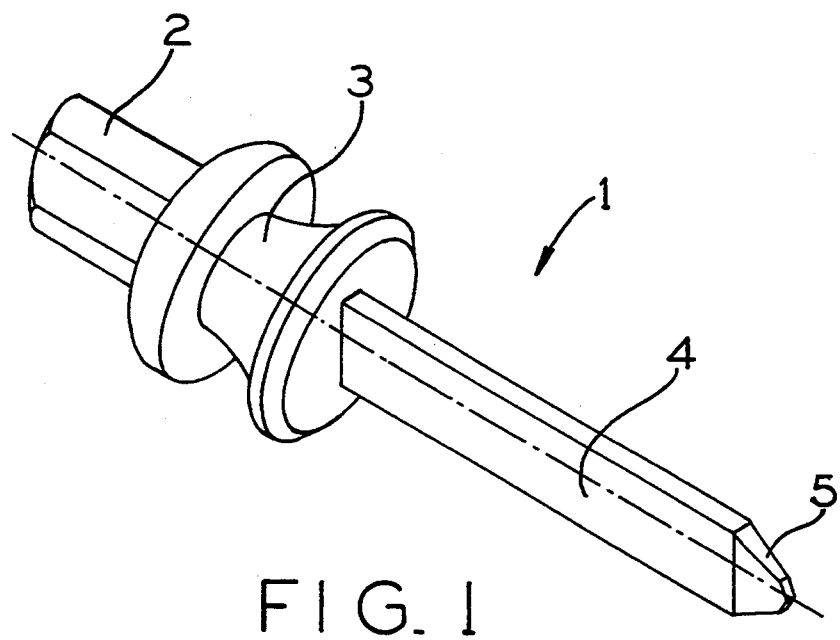
FIG. 1, a perspective view of a setting tool according to the invention.

Shown perspectively in FIG. 1 is a setting tool 1 which with its hexagonal toolholder 2 can be fitted in the chuck of a power drill. Molded to the hexagonal toolholder 2 is an adapter 3 from which protrudes a tool blade 4. The adapter 3 is tapered so as to provide a better grip in its assembly. While the toolholder 2 and the adapter 3 consist preferably of plastic, the tool blade 4 consists of a metal of sufficient hardness and wear resistance.

The tool blade 4 is fashioned as a relatively flat slat of constant thickness and constant width and extends into a point 5 of triangular design with a rounded point, its material thickness diminishing forwardly, so that the tool blade 4 with its point 5 assumes a dagger type appearance.

The rounded point 5 also has a shape enabling the driving or retraction of cross-slotted screws with the setting tool 1. This makes it possible to use the setting tool 1 also as an emergency screwdriver.

The tool blade 4 has a material thickness of, e.g., 1.3 mm and a length of about 40 mm. The adapter 3 may have a length of 10 mm, the toolholder 2 one of 15 mm.

Figure 2:
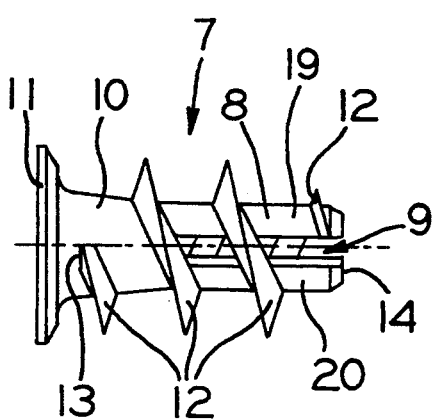
FIG. 2, a side elevation of the insert according to the invention.

The setting tool 1 serves the setting of an insert 7 illustrated in FIG. 2 and consisting of plastic or die-cast zinc. The insert 7 features a cylindrical core section 8 through which extends a slot 9 visible in FIG. 2. The slotted cylindrical core section 8 extends into a conic section 10 extending on the rear end of the insert 7 into a collar 11.

The cylindrical core section 8 and the conic section 10 are surrounded by a coarse-pitch threading 12 fashioned as a self-tapping external threading, so that the insert 7, as it is screwed into a bore in a lightweight construction material, cuts a threading in which the insert 7 finds a hold without expansion pressure.

Figure 4:
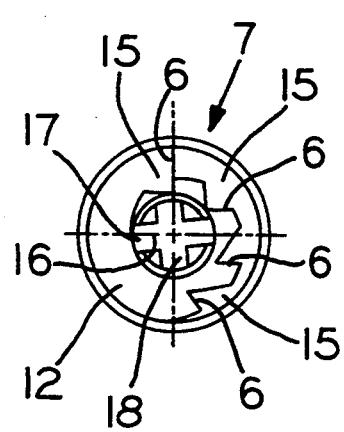
FIG. 4, a front end view of the insert illustrated in FIG. 2, viewed in axial direction.

The self-tapping threading 12 ends at the point marked 13, before the collar 11 on the rear end of The insert 7, and dwindles on The front, or insertion, end 14 of the insert 7 with an ever-diminishing thread height, as can be seen best from FIG. 4.

FIG. 4 also shows that in the spire of the threading 12 adjacent to The insertion end there are several recesses 15 provided, forming several cutting edges 6 which facilitate The tapping of the threading 12 in a lightweight construction material, specifically a plasterboard panel. The conic area 10 solidifies the plasterboard panel at the rear end of the insert 7, enabling thereby higher retention forces of The mounting device.

Figure 3:
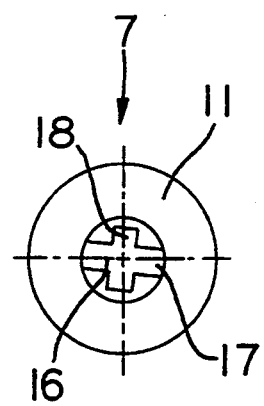
FIG. 3, a rear end view of the insert illustrated in FIG. 2.

FIG. 3 shows a view of the rear end of the insert 7 and the collar 11, the latter being ring-shaped in plan view. Visible both in FIG. 3 and FIG. 4 is a cavity 16 cross-slotted in cross section, which in axial direction extends through the insert 7. The cross-shaped cavity serves after the setting of the insert 7 to receive a fastener, particularly a screw 27 (FIG. 8), which with its threading is allowed to tap into the plastic surrounding the cavity 16.

The cavity 16 consists of a wider flat slot 17, which in FIG. 2, 3 and 4 extends nearly horizontally, and of a narrower flat slot 18, which in FIG. 3 and 4 extends almost vertically. The wide flat slot 17 and the narrow flat slot 18 traverse the insert 7 from the rear end on the collar 11 to the insertion end 14.

The wider flat slot 17 has a width corresponding to the core diameter of the threading 12, respectively to the outside diameter of the cylindrical core section 8. Therefore, the wide flat slot 17 in the cylindrical core section 8 forms the already mentioned slot 9 forming a first shank 19 and a second shank 20, which by the turns of the surrounding threading 12 are mechanically so stabilized that the slot 9 will not result in any appreciable weakening of the insert 7 in its front area.

The width of the tool blade 7 corresponds to the width of the wider flat slot 17, and thus to the diameter of the cylindrical core section 8. This can be seen especially distinctly in FIG. 5.

FIG. 5 shows a lightweight material wall 22, specifically a plasterboard panel, in which the tool blade 4 has produced a rough hole 21 which is cylindrical nearly all the way, after the setting tool 1 has been slipped—starting at the collar 11—into the flat slot 17 of the insert until the adapter 3 bears on the collar 11 and after the setting tool 1—with its toolholder 2 fitted in the chuck 23 of a power drill—has been rotated.

-During the rotations generated with the aid of the power drill, the point 5 of the setting tool 1 first digs through the upper layer, specifically a cardboard layer, of the lightweight material panel 22. Next, it traverses the lightweight construction material 22 and emerges again, as can be seen from FIG. 5, on the opposite side of the lightweight material panel 22.

Shortly thereafter, the insertion end 14 of the cylindrical section 8, its diameter corresponding to the width of the tool blade 4, proceeds into the just prepared rough hole 21 in the lightweight construction material 22 as soon as the first turn of the threading 12 engages with its cutting edges 6 the material of the lightweight panel 22, so that the insert 7 produces a threaded hole in it.

FIG. 6 depicts in a section along line VI—VI of FIG. 5 the geometric ratios and shows particularly how the width of the tool blade 4 entirely occupies the wider flat slot 17 and reaches up to the surface of the cylindrical core section 8, while the threading 12 produces a threading which reaches up to the dotted circle 24.

Making the threading in the light weight material panel 22 is completed after a few revolutions, and the insert 7 is screwed in as shown in FIG. 7. Instead of a power drill, also a cross-tipped screwdriver can be used to carry out the setting operation, for which reason the toolholder 2 features an axial depression for the positive insertion of a cross-tip screwdriver. A conic recess 25 in the tool blade 4 is so arranged in the axial depression that the rim of the recess and the point of the crosstip screwdriver will engage well.

FIG. 7 shows particularly also the ratio of the length L1 of the insert 7 to the length L of the tool blade 4 protruding out of the adapter 3. The length of the tool blade 4 outside the adapter is about 1.5 to 3 times as large as the length of the insert 7.

Once the assembly state illustrated in FIG. 7 has been reached, the setting tool 1 can be retracted out of the insert 7 screwed into the lightweight material panel 22, in order to attach an object 26 with the aid of a screw 27, which by means of the setting tool 1 can be twisted, through the object 26 to be fastened, into the cavity 16 of the insert 7. Once the screw 27 has been spun in, the fastening of the object 26 to the lightweight material panel 22 is obtained as illustrated in FIG. 8, without expansion pressure.

FIG. 9 shows a cross section through the lightweight material panel 22 and insert 7 along with screw 27, detailing how the threading 28 of the screw 27 is cut into the plastic material between the wide flat slot 17 and the narrow flat slot 18.

From the above description it follows that the insert 7 can be set in a single operation without requiring a separate operation for preparing the rough hole 21. The result is a simple and quick assembly at low material expense.

What is claimed is:

1. A device for fastening an object to a wall, comprising:
    an insert having self-tapping external threads, a cavity, and an insertion end; and
    a setting tool removably engaging said insert cavity, said setting tool having a tool blade protruding through said insert cavity and said insertion end, said tool blade including a flat, slat-like configuration and a drilling point for making a rough opening in a said wall, said setting tool including means for screwing said insert into said rough opening whereby said external threads engage said rough opening.

2. The fastening device of claim 1, wherein the minimum diameter of said external threads define a core diameter, said rough opening having a diameter about the same as said core diameter.

3. The fastening device of claim 1, wherein said tool blade has a dagger-like configuration, and said drilling point is tapered.

4. The fastening device of claim 1, wherein said tool blade has a flat, slat-like configuration with a generally rectangular cross section.

5. The fastening device of claim 1, wherein said tool blade has a length of about 1.5 to 3 times the length of said insert.

6. The fastening device of claim 1, wherein said tool blade comprises a toolholder disposed axially opposite said drilling point.

7. The fastening device of claim 6, wherein said toolholder comprises an adapter and a hexagonal section.

8. The fastening device of claim 7, wherein said hexagonal section includes an axial recess for receiving a cross-tipped screwdriver.

9. The fastening device of claim 8, wherein said tool blade has a generally rectangular cross section, said tool blade extending into said axial recess at an end opposite said drilling point, said tool blade including a conic recess for positively engaging the cross-tipped screwdriver.

10. The fastening device of claim 2, wherein said tool blade has a width about the same as said core diameter.

11. The fastening device of claim 10, wherein said insert includes a core diameter which is larger than said tool blade width at the axial end opposite said insertion end.

12. The fastening device of claim 11, wherein said external threading has a height which is smaller at the insertion end than at the opposite axial end.

13. The fastening device of claim 1, wherein said external threading comprises tooth-shaped recesses defining respective cutting edges.

14. The fastening device of claim 1, wherein said cavity has a generally uniform cross section.

15. The fastening device of claim 2, wherein said cavity comprises first and second slots defining a generally cross-shaped cavity cross section, said first slot having a height slightly larger than said tool blade and about the same as said core diameter at said insertion end, said second slot having a height which is less than said core diameter.

16. The fastening device of claim 1, further comprising a fastener screwed into said insert cavity upon removal of said setting tool.

17. A device for fastening an object to a wall, comprising:
an insert having self-tapping external threads, a rear end, an insertion end, and a cavity axially extending from said rear end to said insertion end; and
a setting tool removably engaging said insert cavity, said setting tool having a tool blade protruding through said insert cavity and said insertion end, said tool blade including a drilling point for making a rough opening in a said wall, said setting tool including means for screwing said insert into said rough opening whereby said external threads engage said rough opening, said screwing means comprising a complementary shaping of said insert cavity and said tool blade whereby said tool blade within said insert cavity positively engages said insert to rotationally fix said insert relative to said tool blade.

18. A method of attaching a threaded fastener to a wall, comprising the steps of:
removably engaging a cavity of an insert with a setting tool, said insert including self-tapping external threading and an insertion end, said setting tool having a tool blade protruding through said insert cavity and said insertion end, said tool blade including a flat, slat-like configuration and a drilling point;
forming a rough opening in the wall with said drilling point;
screwing said insert into said rough opening with said setting tool, whereby said external threads engage said rough opening;
removing said setting tool from said insert cavity; and
screwing said fastener into said insert cavity.

* * * * *

UNITED STATES PATENT AND TRADEMARK OFFICE
CERTIFICATE OF CORRECTION

PATENT NO. : 5,403,137
DATED : April 4, 1995
INVENTOR(S) : Jurgen Grun & Albert Frischmann It is certified that error appears in the above-indentified patent and that said Letters Patent is hereby corrected as shown below:

On the title page: "Foreign Application Priority Data", delete "Oct. 5, 1991 [DE] Germany 41 33105.2".

Claim 4, column 5, line 5, delete "flat slat-like configuration with"

Signed and Sealed this

Eighth Day of April, 1997

Attest:

*Attesting Officer*

BRUCE LEHMAN

*Commissioner of Patents and Trademarks*